July 28, 1964  D. F. STRANBERG ETAL  3,142,503
MULTIPLE THREADED LONGITUDINALLY SPLIT HOSE COUPLING
Filed Sept. 30, 1960  2 Sheets-Sheet 1
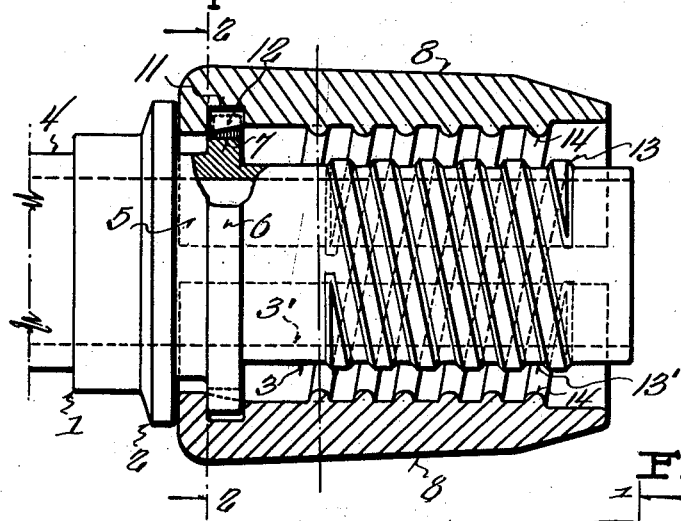
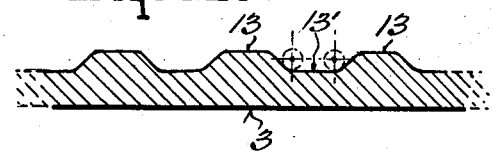
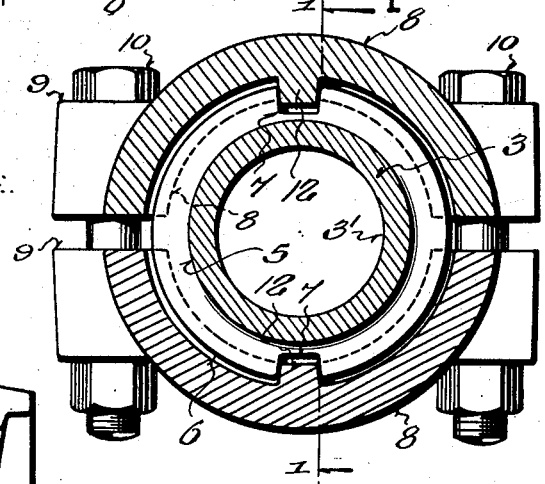
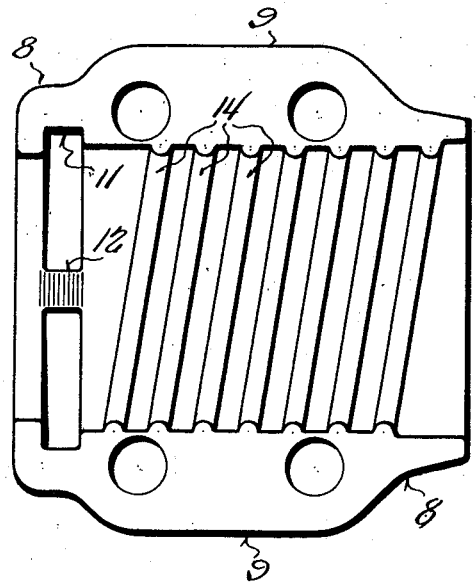
Inventors:
Don F. Stranberg
Roger R. Luther

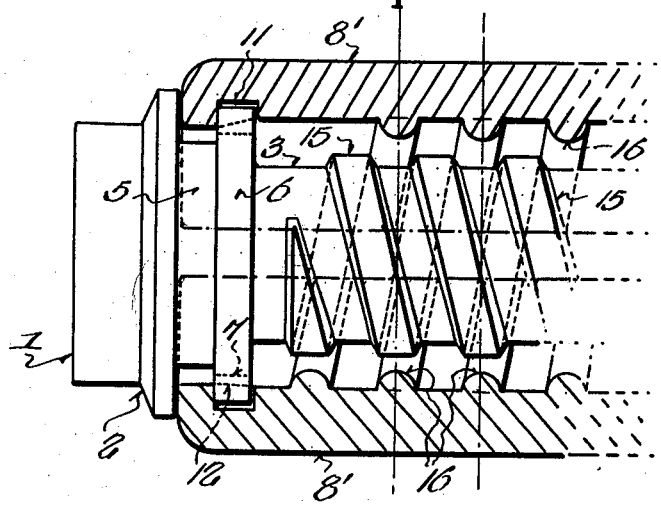
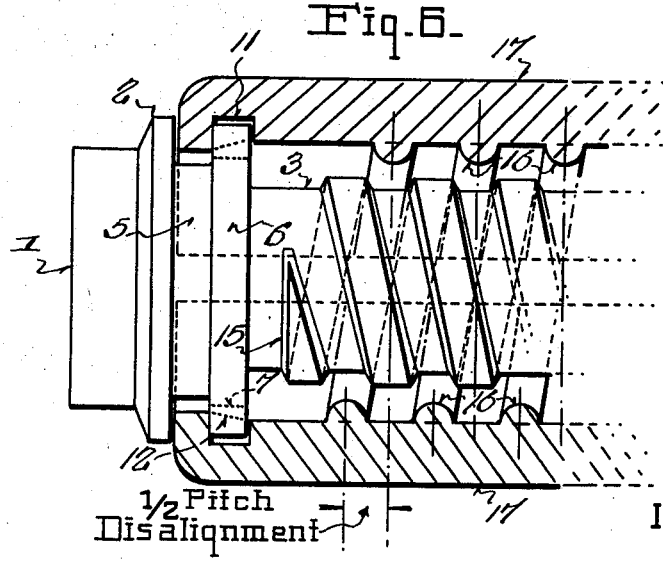

United States Patent Office 3,142,503
Patented July 28, 1964

3,142,503
MULTIPLE THREADED LONGITUDINALLY SPLIT HOSE COUPLING
Don F. Stranberg, Waukegan, and Roger R. Luther, Zion, Ill., assignors to Anchor Coupling Co. Inc., Libertyville, Ill., a corporation of Illinois
Filed Sept. 30, 1960, Ser. No. 59,730
5 Claims. (Cl. 285—243)

The present invention relates generally to split clamp hose couplings, and has primarily for its object the provision of exceedingly simple and inexpensive means for materially improving the attachment of such couplings to a hose end by increasing the gripping action of the component parts of the coupling upon the hose wall, to the extent of reducing possibility of leakage and stripping to a minimum and prolonging the length of service of the assembly.

Incidental to the foregoing, a more specific object of the invention resides in the novel formation of cooperative gripping ribs on the coupling insert or stem, and complementary clamp sectors.

Another object is to provide gripping threads on the insert and inner faces on the clamp sectors, the crests of the threads of the sectors being in diametric alinement with the roots of the insert threads, and means for circumferentially indexing the sectors on the insert to insure and maintain such alinement.

A further object is to form the gripping threads on the insert and clamp sectors in even multiples to permit the use of complementary identical sector halves.

A still further object is to provide the insert with threads having substantially equal widths of roots and flats, the sides of the threads joining the roots on radiuses of approximately ½ the depth of the thread to allow the hose wall material to flow and completely fill the spaces between the threads.

The accompanying drawing illustrates one complete example of the physical embodiment of the present invention constructed accordingly to the best method so far devised for the practical application of the principles of the invention. Other forms and modifications of the structural features shown are contemplated within the scope of the appended claims.

In the drawing:

FIG. 1 is a partial sectional and partial elevational view, taken substantially on the line 1—1 of FIG. 2;

FIG. 2 is a transverse sectional view taken on the line 2—2 of FIG. 1;

FIG. 3 is an elevational view of the gripping face of one of the clamp sectors;

FIG. 4 is an enlarged fragmentary sectional view illustrating a preferred form of insert threads;

FIG. 5 is an exaggerated schematic sectional view for explanatory purposes, the same illustrating the use of single gripping threads; and FIG. 6 is a similar view of a modified structure of FIG. 5, essential to accomplish one of the salient purposes of the invention.

Referring now more particularly to the accompanying drawing, the numeral 1 designates generally an insert, consisting of a head 2 and stem 3 having an axial bore 3'. A conduit, tube or attaching fitting 4 is suitably secured in the head 2, which also has an annular groove 5 formed therein to create a flange 6 provided with diametrically spaced notches 7.

Mounted on the insert 1 is a pair of complementary split clamp sectors 8, having radial attaching lugs 9 for reception of contracting bolts 10 that draw the sectors together on the outer surface of a hose into which the stem 3 has been inserted. The inner face of each sector 8 has an arcuate groove 11 formed therein for reception of the insert flange 6, as best shown in FIG. 1, and within the groove 11 a transverse rib or web 12 engages one of the notches 7 to circumferentially index the sector in a predetermined relative angular position on the insert.

Aside from the indexing feature just described, the foregoing structure is conventional. Therefore, as stated in the preceding objects, the salient feature of the invention, consisting of the novel character of gripping means formed on the functional surfaces of the insert and clamp sectors, in combination with the indexing feature, which will now be described in detail.

The outer diameter of the stem 3 is approximately that of the normal inner diameter of the hose, and is provided with a plurality of threads 13 comprising helical ribs and intervening grooves on the stem. As the insert is turned into the end of a hose, the threads 13 embed themselves into the hose wall. The inner faces of the clamp sectors 8 are also provided with a plurality of threads 14 comprising spaced ribs and intervening grooves, the pitch of said threads 14 corresponding to that of the stem threads 13; and when the clamp sectors 8 are indexed properly on the insert, by means of the notches 7 and webs 12, the ribs of the threads 14 are radially alined with the grooves 13' of the stem threads 13, and vice-versa.

It will be apparent that the staggered relation of the gripping threads creates a substantially uniform compression of the hose wall, and because of the crimping effect on the hose wall, maximum gripping and holding is obtained without mutilating or weakening the hose wall material to cause early fatigue and resultant leakage or stripping of the hose.

While the foregoing results could be obtained with a single gripping thread formed on the stem and sectors, such an arrangement presents a serious objection, in that identical complementary single threads formed on the gripping sectors could not be used since the ribs of the theads of one clamp half would necessarily be in radial alinement with the ribs of the stem thread rather than with the thread grooves, see FIG. 5.

To overcome the foregoing objection, non-identical sector halves having their respective gripping threads relatively dis-alined ½ of their pitch would necessarily be required. See FIG. 6. The same would also be true in the use of any uneven multiple number of threads such as, three, five, etc. On the other hand any even multiple of threads, such as two, four, etc., would best accomplish the purpose of the invention with identical clamp halves, see FIG. 1.

For a better appreciation of the above problem and its solution, FIG. 5 is an exaggerated schematic view showing a stem having a single thread 15, and a pair of identical clamp halves 8' having single gripping threads 16, corresponding in pitch with threads 15. As illustrated, the ribs of the gripping thread 16 in the top clamp sector are properly alined radially with the grooves of the stem thread 15. However, the ribs of the thread 16 in the lower clamp half then becomes alined with the ribs of the stem thread 15, which defeats the invention.

To overcome the foregoing discrepancy and maintain the desired relation between the stem thread and the sector thread it would be necessary to provide a pair of non-identical sector halves 17, as shown schematically in FIG. 6, in which the ribs of the gripping thread 16 in the top clamp half is radially dis-alined ½ pitch with relation to the ribs of the thread 16 on the lower clamp half.

Obviously, the necessity to provide different sector halves would create serious objections with respect to increased cost, maintaining proper inventory, segregation of parts and care in selections of mating parts.

Finally, it may be contended that the prior art in which the coupling stem and clamp sectors are provided with annular gripping ribs, in staggered relative longitudinal relation, provide the same gripping effect as accomplished by the present relation of gripping threads. However, an important distinction and obvious advantage is accomplished by the present invention in utilizing gripping threads as distinguished from annular ribs, since insertion of the coupling stem into the end of a hose by means of the thread, materially facilitates assembly of the coupling.

Lastly, highly important and novel elements of the invention, that make it most practical from the standpoint of economy, both in production and assembly, are the proper indexing of the component parts in combination with the use of even multiple numbers of gripping threads.

From the foregoing explanation, considered in connection with the accompanying drawings, it will be readily seen that exceedingly simple and inexpensive means has been devised for the best mode of assembling and attaching clamp type couplings to hose ends to prevent leakage and stripping, and also materially increase the life of the assembly.

We claim:

1. A hose coupling of the split clamp type comprising an insert including an attaching head and stem, an even multiple number of threads formed on said stem, a pair of complementary identical clamp sectors interlocked on said insert against relative longitudinal movement, gripping threads formed on the inner faces of said clamp sectors and conforming to the number and pitch of said stem threads, and means formed on the stem and clamp sectors for circumferentially indexing said clamp sectors on said insert to aline the ribs of the gripping threads of the clamp sectors with the grooves of the stem threads.

2. A hose coupling of the split clamp type comprising an insert including an attaching head and stem, an even multiple number of threads formed on said stem and providing alternate ribs and grooves of substantially equal width and surfaces connecting the ribs and grooves of said threads and curved on a radius of length equal to approximately one-half of the height of the threads, a pair of complementary identical clamp sectors interlocked on said insert against relative longitudinal movement, gripping threads formed on the inner faces of said clamp sectors and conforming to the number and pitch of said stem threads, and means formed on the stem and clamp sectors for circumferentially indexing said clamp sectors on said insert to aline the ribs of the gripping threads of the clamp sectors with the grooves of the stem threads.

3. A hose coupling of the split clamp type as set forth in claim 1, wherein the threads on said stem and on the inner faces of said clamp sectors form spaced ribs and intermediate grooves, the width of the grooves being substantially equal to the width of the ribs.

4. A hose coupling of the split clamp type as set forth in claim 1, wherein the threads on said stem and on the inner faces of said clamp sectors form spaced ribs and intermediate grooves, the ribs and grooves of the stem respectively being substantially equal in width to the grooves and ribs of the clamp sectors.

5. A hose coupling of the split clamp type as set forth in claim 1, wherein the threads on said stem and on the inner faces of said clamp sectors form spaced ribs and intermediate grooves, said threads on said stem having surfaces curved on a radius of approximately one-half the depth of the threads and connecting the ribs and grooves of said stem threads.

References Cited in the file of this patent

UNITED STATES PATENTS

| 48,709 | Emory | July 11, 1865 |
| 1,844,023 | Terry | Feb. 9, 1932 |
| 2,512,741 | Goodall | June 27, 1950 |

FOREIGN PATENTS

| 334,935 | Great Britain | Sept. 12, 1930 |
| 758,809 | Great Britain | Oct. 10, 1956 |